(12) United States Patent
York et al.

(10) Patent No.: US 9,205,582 B2
(45) Date of Patent: Dec. 8, 2015

(54) CO-INJECTION MOULDING

(75) Inventors: Geoffrey York, Walsall (GB); Esak Shabudin, Banbury (GB)

(73) Assignee: Kraft Foods R & D, Inc., Deerfield, IL (US)

(*) Notice: Subject to any disclaimer, the term of this patent is extended or adjusted under 35 U.S.C. 154(b) by 236 days.

(21) Appl. No.: 13/634,512

(22) PCT Filed: Mar. 14, 2011

(86) PCT No.: PCT/US2011/028340
§ 371 (c)(1),
(2), (4) Date: Nov. 12, 2012

(87) PCT Pub. No.: WO2011/115905
PCT Pub. Date: Sep. 22, 2011

(65) Prior Publication Data
US 2013/0056466 A1 Mar. 7, 2013

(30) Foreign Application Priority Data

Mar. 15, 2010 (GB) .................................. 1004302.4

(51) Int. Cl.
*B29C 45/16* (2006.01)
*B29C 45/00* (2006.01)
(Continued)

(52) U.S. Cl.
CPC ......... *B29C 45/1642* (2013.01); *B29C 45/0046* (2013.01); *B65D 85/8043* (2013.01);
(Continued)

(58) Field of Classification Search
CPC .............. B29C 2045/1614; B29C 2045/1648; B29C 33/42; B29C 45/0046; B29C 45/1642; B29C 45/1645
USPC .......................... 264/328.8, 328.12
See application file for complete search history.

(56) References Cited

U.S. PATENT DOCUMENTS 3,453,456 A 7/1969 Oltman et al.
3,921,856 A 11/1975 Langecker
(Continued)

FOREIGN PATENT DOCUMENTS

EP 0735945 B1 10/1996
EP 1440903 A1 7/2004
(Continued)

OTHER PUBLICATIONS

International Search Report and Written Opinion for PCT/US2011/028340 dated Jul. 19, 2011 (13 pages).
(Continued)

*Primary Examiner* — Jill Heitbrink
(74) *Attorney, Agent, or Firm* — Fitch, Even, Tabin & Flannery LLP (57) ABSTRACT

The present invention relates to advancements in injection molding and in particular to a method and apparatus for co-injection molding articles of complex non symmetrical geometry. The method forms a multilayer injection molded article comprising an outer skin of a first material and a central core of a second material which is encapsulated by the outer skin. The first and second materials are injected in a single stream into a cavity of an injection mold, with the second material encased within the first material. The flow of the stream is controlled by means of flow paths within the mold cavity such that both the first and second materials are present in at least one first area of the mold cavity and that only the first material is present in at least one second area of the mold cavity. The flow paths include at least one primary flow path in the first mold cavity area which divides into at least two secondary flow paths. The resistance of a first of the secondary flow paths in the at least one first mold cavity area is reduced relative to that of a second of the two secondary flow paths, which is in the at least the second mold cavity area.

18 Claims, 9 Drawing Sheets

(51) Int. Cl.
*B65D 85/804* (2006.01)
*B29C 33/42* (2006.01)

(52) U.S. Cl.
CPC ......... *B29C33/42* (2013.01); *B29C 2045/1614* (2013.01); *B29C 2045/1648* (2013.01); *B29K 2995/0067* (2013.01)

(56) References Cited

U.S. PATENT DOCUMENTS

| | | | |
|---|---|---|---|
| 3,947,177 A | 3/1976 | Eckardt | |
| 4,017,240 A | 4/1977 | Nelson | |
| 4,108,956 A | 8/1978 | Lee | |
| 4,174,413 A | 11/1979 | Yasuike et al. | |
| 4,497,621 A | 2/1985 | Kudert et al. | |
| 4,512,194 A | 4/1985 | Beuter | |
| 4,518,344 A | 5/1985 | Latreille et al. | |
| 4,525,134 A | 6/1985 | McHenry et al. | |
| 4,526,821 A | 7/1985 | McHenry et al. | |
| 4,533,308 A | 8/1985 | Cloeren | |
| 4,550,043 A | 10/1985 | Beck | |
| 4,554,190 A | 11/1985 | McHenry et al. | |
| 4,708,618 A | 11/1987 | Reifenhauser et al. | |
| 4,717,324 A | 1/1988 | Schad et al. | |
| 4,751,035 A | 6/1988 | McHenry et al. | |
| 4,775,308 A | 10/1988 | Schad et al. | |
| 4,781,954 A | 11/1988 | Krishnakumar et al. | |
| 4,863,369 A | 9/1989 | Schad et al. | |
| 4,863,665 A | 9/1989 | Schad et al. | |
| 4,950,143 A | 8/1990 | Krishnakumar et al. | |
| 5,028,226 A | 7/1991 | De'ath et al. | |
| 5,034,179 A | 7/1991 | Richter | |
| 5,049,750 A | 9/1991 | Hoshino et al. | |
| 5,098,274 A | 3/1992 | Krishnakumar et al. | |
| 5,131,830 A | 7/1992 | Orimoto et al. | |
| 5,135,377 A | 8/1992 | Gellert | |
| 5,143,733 A | 9/1992 | Von Buren et al. | |
| 5,167,157 A | 12/1992 | Wertz et al. | |
| 5,232,710 A | 8/1993 | Miyazawa et al. | |
| 5,238,715 A | 8/1993 | Wefers et al. | |
| 5,354,378 A | 10/1994 | Hauser et al. | |
| 5,401,454 A | 3/1995 | Mendel | |
| 5,510,065 A | 4/1996 | McFarlane | |
| 5,513,531 A | 5/1996 | Sapia et al. | |
| 5,516,273 A | 5/1996 | Delmore et al. | |
| 5,518,389 A | 5/1996 | Nonomura et al. | |
| 5,556,582 A | 9/1996 | Kazmer | |
| 5,662,856 A | 9/1997 | Wunderlich | |
| 5,683,731 A | 11/1997 | Deardurff et al. | |
| 5,718,927 A | 2/1998 | Ohta et al. | |
| 5,728,407 A | 3/1998 | Matsui | |
| 5,750,159 A | 5/1998 | Delmore et al. | |
| 5,763,033 A | 6/1998 | Tropsha et al. | |
| 5,763,773 A | 6/1998 | Birchak et al. | |
| 5,772,933 A | 6/1998 | Kotzab | |
| 5,819,507 A | 10/1998 | Kaneko et al. | |
| 5,833,899 A | 11/1998 | Wunderlich | |
| 5,914,138 A | 6/1999 | Swenson | |
| 5,935,615 A | 8/1999 | Gellert et al. | |
| 5,972,258 A | 10/1999 | Sicilia | |
| 5,984,657 A | 11/1999 | Bentivoglio | |
| 6,030,198 A | 2/2000 | Babin | |
| 6,062,846 A | 5/2000 | Kalemba | |
| 6,063,325 A | 5/2000 | Nahill et al. | |
| 6,077,470 A | 6/2000 | Beaumont | |
| 6,077,578 A | 6/2000 | Valyi | |
| 6,099,780 A | 8/2000 | Gellert | |
| 6,103,167 A * | 8/2000 | Mukai et al. | 264/255 |
| 6,171,538 B1 | 1/2001 | Beck et al. | |
| 6,187,241 B1 | 2/2001 | Swenson | |
| 6,194,041 B1 | 2/2001 | McHenry et al. | |
| 6,203,305 B1 | 3/2001 | Hofstetter et al. | |
| 6,276,914 B1 | 8/2001 | Sicilia | |
| 6,305,923 B1 | 10/2001 | Godwin et al. | |
| 6,309,207 B1 | 10/2001 | Kalemba | |
| 6,341,954 B1 | 1/2002 | Godwin et al. | |
| 6,350,401 B1 | 2/2002 | Gellert et al. | |
| 6,387,423 B1 | 5/2002 | Brunsbach | |
| 6,428,727 B1 | 8/2002 | Rees | |
| 6,440,350 B1 | 8/2002 | Gellert et al. | |
| 6,494,097 B1 | 12/2002 | Shihadeh | |
| 6,503,438 B2 | 1/2003 | Beaumont et al. | |
| 6,517,337 B1 | 2/2003 | Hehl | |
| 6,558,762 B2 | 5/2003 | Cahill et al. | |
| 6,575,729 B2 | 6/2003 | Godwin et al. | |
| 6,596,213 B2 | 7/2003 | Swenson | |
| 6,613,262 B1 | 9/2003 | Arend | |
| 6,630,090 B1 | 10/2003 | Nagaoka | |
| 6,677,013 B1 | 1/2004 | Curie et al. | |
| 6,852,264 B2 | 2/2005 | Ouellette | |
| 6,878,316 B1 | 4/2005 | Cochran et al. | |
| 6,908,581 B2 | 6/2005 | Sabin et al. | |
| 7,306,446 B2 | 12/2007 | Sabin et al. | |
| 7,399,442 B2 | 7/2008 | Sabin et al. | |
| 7,517,480 B2 | 4/2009 | Sabin et al. | |
| 7,695,266 B2 | 4/2010 | MacDonald et al. | |
| 2001/0011415 A1 | 8/2001 | Kalemba | |
| 2002/0192401 A1 | 12/2002 | Matsumoto et al. | |
| 2002/0192404 A1 | 12/2002 | Swenson | |
| 2003/0026933 A1 | 2/2003 | Kermet | |
| 2003/0080452 A1 | 5/2003 | Bulgrin et al. | |
| 2003/0161977 A1 | 8/2003 | Sabin et al. | |
| 2004/0076703 A1 | 4/2004 | Saulle | |
| 2004/0155379 A1 | 8/2004 | Kajikawa et al. | |
| 2004/0261532 A1 | 12/2004 | Sabin et al. | |
| 2004/0265422 A1 | 12/2004 | Sabin et al. | |
| 2006/0113710 A1 | 6/2006 | Bemis et al. | |
| 2011/0217496 A1 * | 9/2011 | Swenson | 428/35.7 |

FOREIGN PATENT DOCUMENTS

| | | |
|---|---|---|
| JP | S63-005540 | 1/1988 |
| JP | H01-009145 | 1/1989 |
| JP | H01-500582 | 3/1989 |
| JP | 01-233178 * | 9/1989 |
| JP | 01233132 | 9/1989 |
| JP | 02111531 | 4/1990 |
| JP | 3023918 A | 1/1991 |
| JP | H03-023918 | 1/1991 |
| JP | 03086510 | 4/1991 |
| JP | H08-156904 | 6/1996 |
| JP | H09-507798 | 8/1997 |
| JP | 10052835 | 2/1998 |
| JP | H10-052835 | 2/1998 |
| JP | 2004160985 A | 6/2004 |
| JP | 2004-523398 A | 8/2004 |
| JP | 2007-535332 A | 12/2007 |
| JP | 2008307846 A | 12/2008 |
| JP | 2013-522074 A | 6/2013 |
| WO | 02081172 A1 | 10/2002 |
| WO | 2008087553 A1 | 7/2008 |

OTHER PUBLICATIONS

Eigl, F. A. et al. "Mehr Verstandnis fur den Kern", vol. 88, No. 1, Jan. 1, 1998, Munchen, DE (4 pages).
Chinese Patent Office, Office Action mailed Mar. 31, 2014, in related Chinese Patent Application No. 201180024279.1, 16 pages.
United Kingdom Intellectual Property Office, Search Report under Section 17, dated May 6, 2010, from corresponding United Kingdom Patent App. No. GB1004302.4, 1 page.
Results of Search conducted Nov. 18, 2009, 401 pages.
Japanese Patent Office Official Notice of Rejection mailed Jan. 6, 2015, from corresponding Japanese Patent App. No. 2013-500123, 2 pages.
Russian Patent Office, Office Action dated Feb. 20, 2015 from corresponding Russian Patent Application 2012142994, 3 pages.

* cited by examiner

CO-INJECTION MOULDING

CROSS REFERENCE TO RELATED APPLICATIONS

This application is a U.S. national phase application of International Application No. PCT/US2011/028340, filed Mar. 14, 2011, which claims benefit from Great Britain application No. 1004302.4, filed Mar. 15, 2010, both of which are hereby incorporated herein by reference in their entirety.

FIELD

The present invention relates to improvements in injection moulding and in particular to a method and apparatus for co-injection moulding articles of complex geometry.

BACKGROUND

It has previously been proposed to seal beverage preparation ingredients in individual air-impermeable packages. For example, cartridges or capsules containing ground coffee are known for use in certain coffee preparation machines which are generally termed "espresso" machines. In the production of coffee using these preparation machines the coffee cartridge is placed in a brewing chamber and hot water is passed though the cartridge at relatively high pressures, thereby extracting the aromatic coffee constituents from the ground coffee to produce the coffee beverage.

In EP-A-1440903 a cartridge is described which is formed from high density polyethylene, polypropylene, polystyrene, polyester, or a laminate of two or more of these materials. The cartridge has an inlet for the introduction of water into the cartridge, and an outlet for a beverage produced from said the beverage ingredients. The cartridge comprises an outer member, an inner member inserted in the outer member and an aperture in a beverage flow path linking the inlet to the outlet for producing a jet of the beverage. The cartridge produces a jet of the beverage which can be used to alter the appearance and characteristics of the dispensed beverage, by for example entraining air into the jet of beverage to produce a multitude of small air bubbles in the dispensed beverage.

The quality of many beverage ingredients, in particular coffee, starts deteriorating when exposed to the air, for example due to oxidisation of fatty acids and evaporation of volatile oils which contribute to the flavour of the beverage. This causes the coffee to have a stale flavour. In order to maintain the quality of the beverage ingredients and to give the cartridges a reasonable shelf life, it is therefore important to prevent the ingress of air and moisture. Thus, whilst the materials used in the manufacture of the cartridges are generally impermeable to liquids, to protect them from air penetration, such cartridges are often packaged in gas impermeable secondary packaging, such as plastic wrappers or metallised foils. Suitable materials used in such packaging are, for example, polyamide coated cellulose film, ethylene vinyl alcohol polymers (EVOH) or other vinyl alcohol polymers (PVOH).

However, the use of secondary packaging has the disadvantage that, once it has been opened, the cartridges are vulnerable to air ingress which causes staling of the product. In addition, it is highly desirable to reduce the amount of packaging used, both in terms of reduction of waste products which need to be disposed of and to reduce packaging costs. Furthermore, it is neither cost effective, nor environmentally friendly, to wrap each cartridge separately.

A number of prior art containers and packages exist, especially for food products, which are gas and water impermeable. For example U.S. Pat. No. 5,819,507 describes a packaging container used for a liquid food formed from a multilayer resin sheet, such as polypropylene and ethylene-vinyl alcohol polymer, polystyrene and ethylene-vinyl alcohol polymer, polyethylene and polystyrene. The sheet is formed by co-extrusion melding or blown film melding deformed into a cylindrical container, which is bonded to a separately formed sleeve or expanded polypropylene or another material of greater rigidity than the resin sheet.

As described in U.S. Pat. No. 6,387,423 a composite sheet can be preformed, for example of polypropylene and ethylene-vinyl alcohol polymer, and the food product wrapped in the sheet and heat sealed.

Whilst the packaging materials described above are highly suitable for protecting the beverage ingredients contained in the cartridges described above, because of their complex shape, the formation of the component parts of the cartridges adds a limitation as to how these materials can be used. The afore-mentioned cartridges are designed to incorporate a variety of features that are not possible with a part formed from sheet material.

It is therefore desirable to retain the present general construction of the cartridges described in EP-A-1440903, whilst making them substantially gas and water impermeable.

Such cartridges are conveniently formed by an injection moulding process, which is one of the most common methods used in manufacturing plastic articles and components for a wide variety of applications. Although tooling is expensive, the cost per part is low and the process is particularly suitable for accurate high volume production of parts which require a high tolerance.

In order that the outer member of the cartridge has sufficient strength and rigidity to maintain its shape and not deform in use, and can be injection moulded, it is necessary to use a suitable polymer such as polypropylene, polyethylene or polystyrene. However whilst these materials are impermeable to liquid, they are not sufficiently impermeable to gases and it is desirable to include a gas impermeable barrier layer, such as ethylene-vinyl alcohol (EVOH) polymer.

Whilst it is possible to form multilayer laminates of different materials, using thermoforming and other processes, the options have hitherto been somewhat limited with injection moulding. Co-injection moulding is a process in which two different materials, such as polymers, are formed into a laminar structure during injection moulding. This produces a sandwich construction of a skin and an inner core. However until recently the polymers used have had to be compatible in so far as they melt at the same temperature and bond together. If the layers are not bonded, the sandwich tends to delaminate, i.e the layers physically separate, due to differential shrinkage.

With recent advances in co-injection techniques, however, it has become possible to mould multi-layer polymer articles using a sandwich consisting of a core enclosed by inner and outer layers in which the materials used for the core and inner/outer layers are different. This means that the core may be formed from a gas impermeable material, such as EVOH, whilst the inner/outer layers may be formed from a more cost effective material such as polyethylene, polypropylene etc. A method of co-injection moulding multi-layer polymer articles is described in WO-A-02/081172.

One of the disadvantages of injection moulding are that the parts to be moulded (and therefore the injection mould itself) must be designed carefully to ensure that the mould can be properly filled, that the finished part can be extracted and that a myriad of other problems are avoided, such as distortion, stress failure and cracking. With an article having a complex geometry, as is required for these cartridge component parts, and the requirement for rigidity as well as impermeability, this has not been hitherto possible to achieve.

However the complexity of the design of the cartridge component parts brings a further significant challenge in co-injection moulding, which is currently generally only used for manufacturing articles having simple, axially symmetric shapes, such as cups and tubs. The structure of a more complex article, for example one which is asymmetric and has ribs and section changes as in the afore-mentioned cartridges component parts, causes turbulence in the plastic flow during the injection process and disrupts the laminar flow required to maintain a contiguous core layer. This results in an uncontrolled layer structure which compromises the uniformity of the core layer. The resulting moulded articles therefore have a structure and layer thickness which cannot be relied on to function as intended, which is particularly disadvantageous where the core layer is intended to be a barrier layer or a uniform coloured layer. This can also cause problems when sealing to a face of a co injected part. It is possible for the inner material to come so close to the outside of the part that the physical strength of any supplementary sealing or welding process would be insufficient for its function.

EP-A-0735943 addresses the problem of co-injection moulding articles having a complex shape by designing the mould cavity so that the flow paths therein all have substantially the same hydraulic resistance. In addition the injection points are selected and the injection temperature, pressure and flow rate are controlled so that the different flows of injected materials meet each other in a fluid condition at a predetermined point.

It is an object of the present disclosure to further improve the method and apparatus for co-injection moulding multi-layered articles having a complex shape.

SUMMARY

The disclosure therefore provides a method of forming a multilayer injection moulded article comprising an outer skin of a first material, and a central core of a second material encapsulated by the outer skin, comprising the steps of:

injecting the first and second materials in a single stream into a cavity of an injection mould, with the second material encased within the first material;

controlling the flow of the stream by means of flow paths within the mould cavity such that both the first and second materials are present in at least one first area of the mould cavity and only the first material is present in at least one second area of the mould cavity, the flow paths including at least one primary flow path in the first mould cavity area, which primary flow path divides into at least two secondary flow paths;

wherein the resistance of a first of the secondary flow paths in the first mould cavity area is reduced relative to that of a second of the two secondary flow path, which is in the second mould cavity area.

Preferably, the first material is substantially liquid impermeable.

Preferably, the second material is substantially gas resistant.

Preferably, the first and second materials are different polymeric materials.

Preferably, the resistance of the first of the secondary flow paths is reduced relative to that of the second of the secondary flow paths by varying one or more of the following elements of the secondary flow paths relative to each other;

the cross sectional area of the secondary flow paths;

the length of the secondary flow paths;

radii between the primary flow path and the first secondary flow path but not the second secondary flow path;

the angle(s) between the primary flow path and one or both of the secondary flow paths.

Preferably, one or more of the secondary flow paths become primary flow paths which divide again to form further secondary flow paths.

Preferably, the primary flow path divides into multiple secondary flow paths.

According to a second aspect, there is provided apparatus for forming a multilayer injection moulded article comprising an outer skin of a first material, and a central core of a second material encapsulated by the outer skin, comprising:

an injection mould having a cavity defining the shape of the moulded article;

means for co-injecting the first and second materials as a single stream into the cavity, with the second material encased by the first material;

said mould cavity comprising flow paths to control the flow of the materials such that both the first and second materials are present in at least one first area of the mould cavity and only the first material is present in at least one second area of the mould cavity;

the flow paths including at least one primary flow path in the first mould cavity area, which primary flow path divides into at least two secondary flow paths, of which one of the secondary flow paths is in the first mould cavity area and has a lower resistance relative to that of other of the secondary flow path, which is in the second mould cavity area.

Preferably, the resistance of the first of the secondary flow paths is reduced relative to that of the second of the secondary flow paths by varying one or more of the following elements of the secondary flow paths relative to each other;

the cross sectional area of the secondary flow paths;

the length of the secondary flow paths;

radii between the primary flow path and the first secondary flow path but not the second secondary flow path;

the angle(s) between the primary flow path and one or both of the secondary flow paths.

Preferably, one or more of the secondary flow paths become primary flow paths which divide again to form further secondary flow paths.

Preferably, the primary flow path divides into multiple secondary flow paths.

The present disclosure also extends to a food or beverage cartridge comprising an outer member formed by the method of the present invention and including a sealing member sealed to the outer member at sealing areas.

The disclosure thus enables the co-injection moulding multilayered articles of more complex geometry than has hitherto been possible, in which the presence of the layers is carefully planned and controlled.

The method differs from the prior art methods which have concentrated on controlling the flow of the injected materials in a single flow by controlling the injection process parameters, such as pressure, temperature etc. Further the flow is controlled by utilising flow paths of different hydraulic resistance to determine where both the core and skin materials flow to and where just the skin material flows to.

BRIEF DESCRIPTION OF THE DRAWINGS

Embodiments will now be described, by way of example only, with reference to the accompanying drawings, in which.

DETAILED DESCRIPTION

By using the method and apparatus of the present disclosure to produce the outer member of a beverage preparation cartridge, the cartridge can be rendered substantially gas and liquid impermeable. By way of background, a prior art beverage preparation cartridge will first be described to illustrate the complexity of the geometry of the component parts, and in particular the outer member. However it should be noted that this is just one application which can be used to form any moulded articles having a complex geometry.

As shown in FIGS. 1 to 13 the prior art beverage preparation cartridge 100 generally comprises an outer member 102 (the moulded article), an inner member 103 and a laminate 105. The outer member 102, inner member 103 and laminate 105 are assembled to form the cartridge 100 which has an interior 106 for containing one or more beverage ingredients, an inlet 107, an outlet 108 and a beverage flow path linking the inlet 107 to the outlet 108 and which passes through the interior 106. The inlet 107 and outlet 108 are initially sealed by the laminate 105 and are opened in use by piercing or cutting of the laminate 105. The beverage flow path is defined by spatial inter-relationships between the outer member 102, inner member 103 and laminate 105 as discussed below. Other components may optionally be included in the cartridge 100, such as a filter 104, as will be described further below.

The cartridge 100 illustrated is particularly designed for use in dispensing espresso-style products such as roast and ground coffee where it is desirable to produce a crema. However, it may be used with other products such as chocolate, coffee, tea, sweeteners, cordials, flavourings, alcoholic beverages, flavoured milk, fruit juices, squashes, sauces and desserts.

Figure 3:
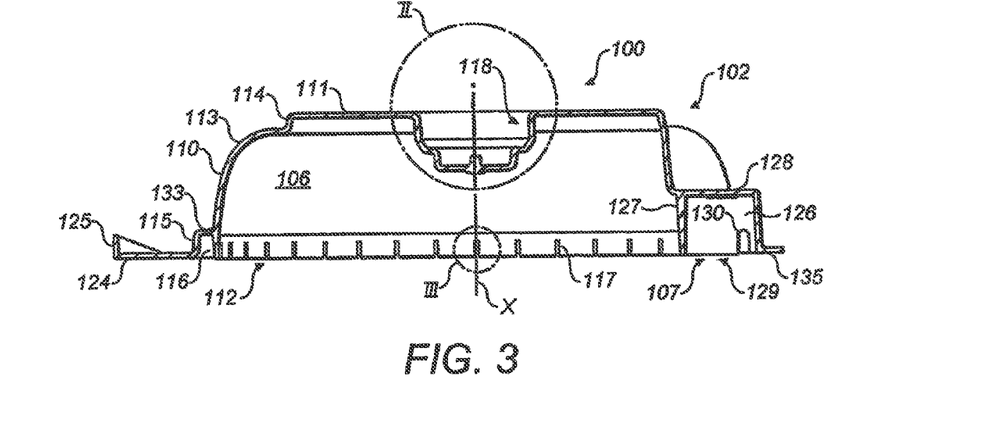
FIG. 3 is cross-sectional side elevation of an outer member of the cartridge of FIG. 1.
Figure 4:
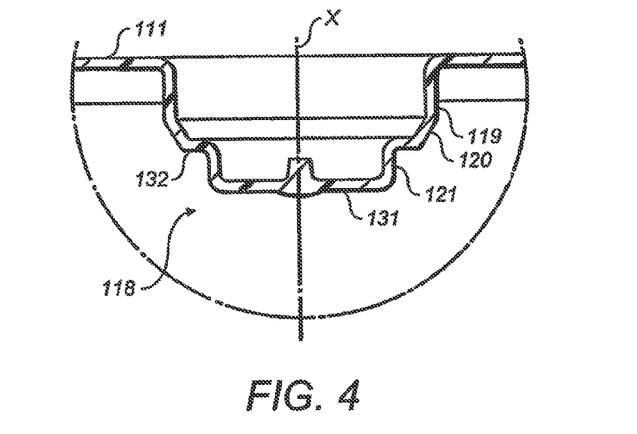
FIG. 4 is a cross-sectional side elevation of a detail of the outer member of FIG. 3 showing an inwardly directed cylindrical extension.
Figure 7:
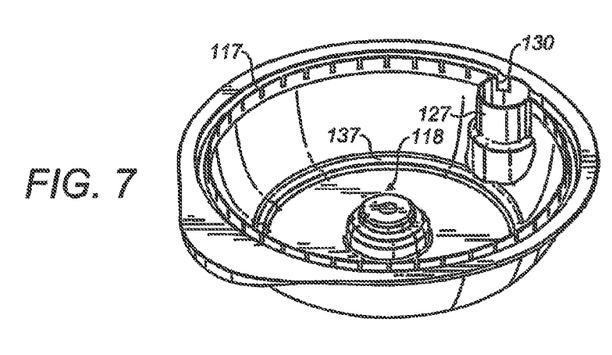
FIG. 7 is a perspective view from above of the outer member of FIG. 3 in an inverted orientation.

As can be seen from FIG. 7, the overall shape of the cartridge 100 is generally circular or disc-shaped with the diameter of the cartridge 100 being significantly greater than its height. A major axis X passes through the centre of the outer member as shown in FIG. 3. Typically the overall diameter of the outer member 102 is 74.5 mm±6 mm and the overall height is 16 mm±3 mm. Typically the volume of the cartridge 100 when assembled is 30.2 ml±20%.

The outer member 102 generally comprises a bowl-shaped shell 110 having a curved annular wall 113, a closed top 111 and an open bottom 112. The diameter of the outer member 102 is smaller at the top 111 compared to the diameter at the bottom 112, resulting from a flaring of the annular wall 113 as one traverses from the closed top 111 to the open bottom 112. The annular wall 113 and closed bottom 112 together define a receptacle having an interior 134.

A hollow inwardly directed cylindrical extension 118 is provided in the closed top 111 centred on the major axis X. As more clearly shown in FIG. 8, the cylindrical extension 18 comprises a stepped profile having first, second and third portions 119, 120 and 121. The first portion 119 is right circular cylindrical. The second portion 120 is frusto-conical in shape and is inwardly tapered. The third portion 121 is another right circular cylinder and is closed off by a lower face 131. The diameter of the first, second and third portion 119, 120 and 121 incrementally decreases such that the diameter of the cylindrical extension 118 decreases as one traverses from the top 111 to the closed lower face 131 of the cylindrical extension 118. A generally horizontal shoulder 132 is formed on the cylindrical extension 118 at the junction between the second and third portions 120 and 121.

Figure 5:
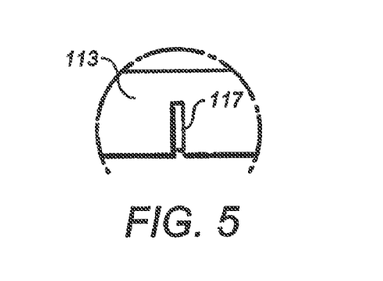
FIG. 5 is a cross-sectional side elevation of a detail of the outer member of FIG. 3 showing a slot.
Figure 6:
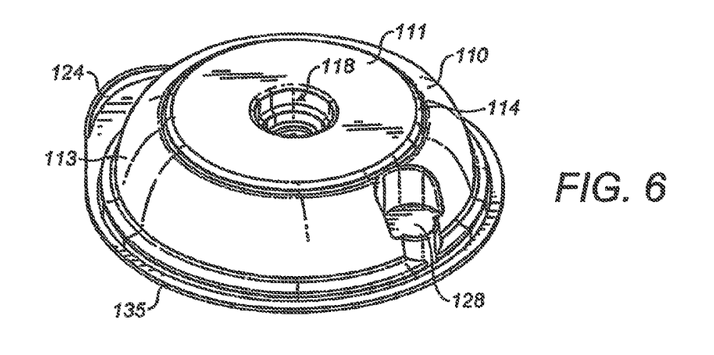
FIG. 6 is a perspective view from above of the outer member of FIG. 3.

An outwardly extending shoulder 133 is formed in the outer member 102 towards the bottom 112. The outwardly extending shoulder 133 forms a secondary wall 115 co-axial with the annular wall 113 so as to define an annular track forming a manifold 116 between the secondary wall 115 and the annular wall 113. The manifold 116 passes around the circumference of the outer member 102. A series of slots 117 are provided in the annular wall 113 level with the manifold 116 to provide gas and liquid communication between the manifold 116 and the interior 134 of the outer member 102. As shown in FIG. 5, the slots 117 comprise vertical slits in the annular wall 113. Between twenty and forty slots are provided. In the embodiment shown thirty-seven slots 117 are provided generally equi-spaced around the circumference of the manifold 16. The slots 117 are preferably between 1.4 and 1.8 mm in length. Typically the length of each slot 117 is 1.6 mm representing 10% of the overall height of the outer member 102. The width of each slot 117 is between 0.25 and 0.35 mm. Typically, the width of each slot 117 is 0.3 mm. The width of the slots 117 is sufficiently narrow to prevent the beverage ingredients passing there through into the manifold 116 either during storage or in use.

An inlet chamber 126 is formed in the outer member 102 at the periphery of the outer member 102. A cylindrical wall 127 is provided, as most clearly shown in FIG. 7, which defines the inlet chamber 126 within, and partitions the inlet chamber 126 from, the interior 134 of the outer member 102. The cylindrical wall 127 has a closed upper face 128 which is formed on a plane perpendicular to the major axis X and an open lower end 129 co-planar with the bottom 12 of the outer member 102. The inlet chamber 26 communicates with the manifold 116 via two slots 130 as shown in FIG. 3. Alternatively, between one and four slots may be used to communicate between the manifold 116 and the inlet chamber 125.

A lower end of the outwardly extending shoulder 133 is provided with an outwardly extending flange 135 which extends perpendicularly to the major axis X. Typically the flange 135 has a width of between 2 and 4 mm. A portion of the flange 135 is enlarged to form a handle 124 by which the outer member 102 may be held. The handle 124 is provided with an upturned rim 125 to improve grip.

Figure 9:
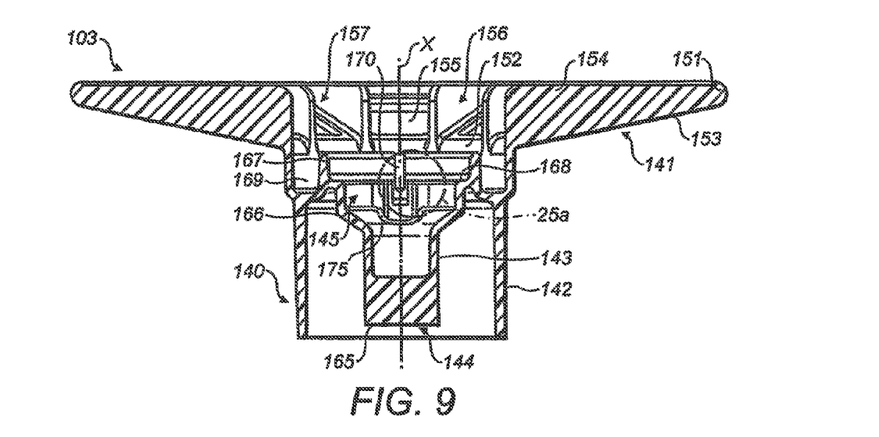
FIG. 9 is a cross-sectional drawing of an inner member of the cartridge.
Figure 9A:
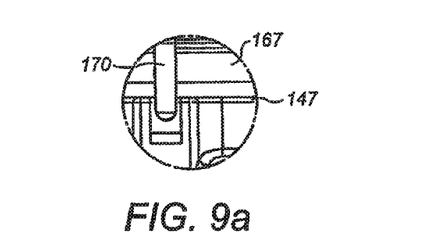
FIG. 9a is a cross-sectional drawing of a detail of the inner member of FIG. 9 showing an aperture.

The inner member 103, as shown in FIGS. 9 to 13, comprises an annular frame 141 and a downwardly extending cylindrical funnel 140. A major axis X passes through the centre of the inner member 103 as shown in FIG. 9.

Figure 10:
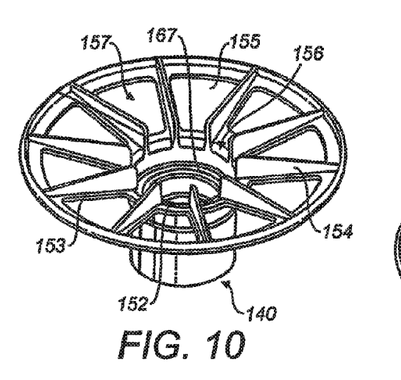
FIG. 10 is a perspective view from above of the inner member of FIG. 9.
Figure 11:
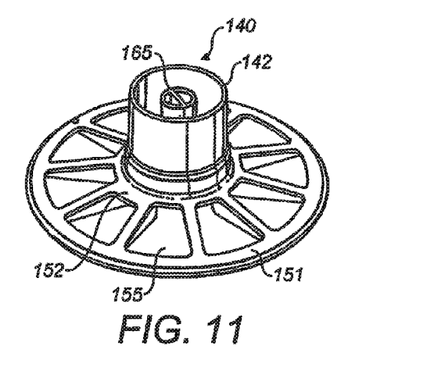
FIG. 11 is a perspective view from above of the inner member of FIG. 9 in an inverted orientation.
Figure 12:
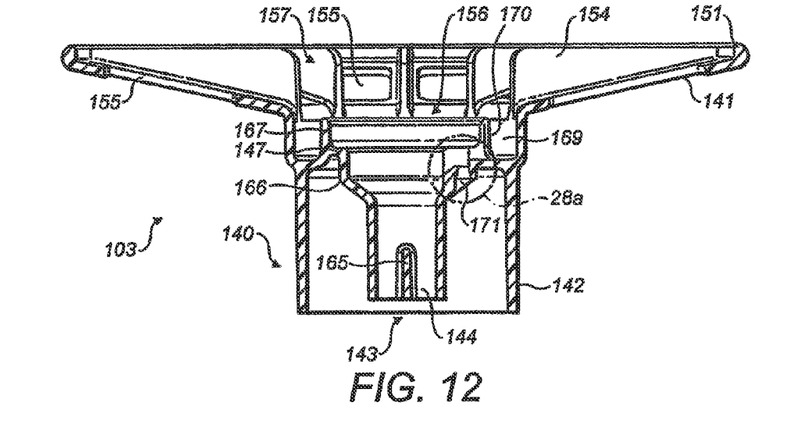
FIG. 12 is another cross-sectional drawing of the inner member of FIG. 9.
Figure 12A:
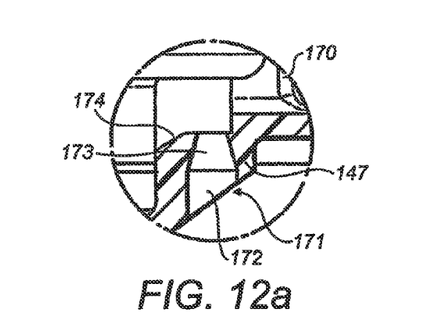
FIG. 12a is a cross-sectional drawing of another detail of the inner member of FIG. 9 showing an air inlet.

As best shown in FIGS. 10 and 11, the annular frame 141 comprises an outer rim 151 and an inner hub 152 joined by ten equi-spaced radial spokes 153. The inner hub 152 is integral with and extends from the cylindrical funnel 140. Filtration apertures 155 are formed in the annular frame 141 between the radial spokes 153. A filter 104 is disposed on the annular frame 141 so as to cover the filtration apertures 155. The filter 104 is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable. The filter 104 may also be treated or coated with a material which is activated by heat and/or pressure so that it can be sealed to the annular frame 141 in this way.

As shown in the cross-sectional profile of FIG. 9, the inner hub 152 is located at a lower position than the outer rim 151, resulting in the annular frame 141 having a sloping lower profile.

The upper surface of each spoke 153 is provided with an upstanding web 154 which divides a void space above the annular frame 141 into a plurality of passages 157. Each passage 157 is bounded on either side by a web 158 and on a lower face by the filter 104. The passages 157 extend from the outer rim 151 downwardly towards, and open into the cylindrical funnel 140 at openings 156 defined by the inner extremities of the webs 154.

The cylindrical funnel 140 comprises an outer tube 142 surrounding an inner discharge spout 143. The outer tube 142 forms the exterior of the cylindrical funnel 140. The discharge spout 143 is joined to the outer tube 142 at an upper end of the discharge spout 143 by means of an annular flange 147. The discharge spout 143 comprises an inlet 145 at an upper end which communicates with the openings 156 of the passages 157 and an outlet 144 at a lower end through which the prepared beverage is discharged into a cup or other receptacle. The profile of the discharge spout 43 comprises a stepped profile with a distinct dog-leg 166 near an upper end of the tube 143.

As shown in FIG. 9, the discharge spout 143 is provided with a partition 165 which extends part way up the discharge spout 143 from the outlet 144. The partition 165 helps to prevent the beverage spraying and/or splashing as it exits the discharge spout 143.

A rim 167 is provided upstanding from the annular flange 147 joining the outer tube 142 to the discharge spout 143. The rim 167 surrounds the inlet 145 to the discharge spout 143 and defines an annular channel 169 between the rim 167 and the upper portion of the outer tube 142. The rim 167 is provided with an inwardly directed shoulder 168. At one point around the circumference of the rim 167 an aperture 170 is provided in the form of a slot which extends from an upper edge of rim 167 to a point marginally below the level of the shoulder 168 as most clearly shown in FIGS. 9 and 9a. The slot has a width of 0.64 mm.

Figure 16A:
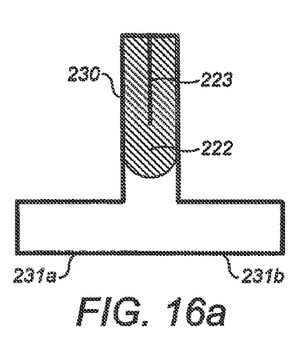
FIGS. 16a to 16d are schematics showing the breakdown of laminar flow of two co-injected materials to a bifurcated section of a complex component.
Figure 16B:
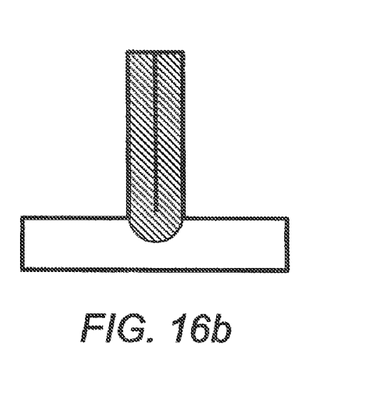
Figure 16C:
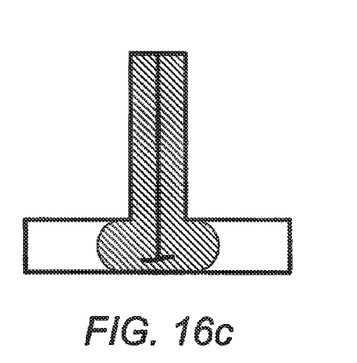
Figure 16D:
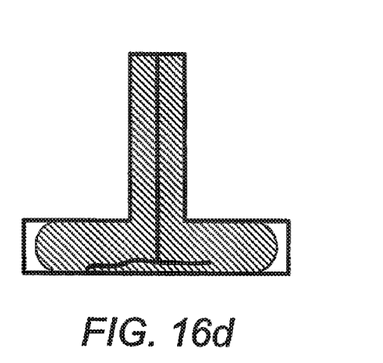

An air inlet 171 is provided in annular flange 147 circumferentially aligned with the aperture 170 as shown in FIGS. 16 and 16a. The air inlet 171 comprises an aperture passing through the flange 147 so as to provide communication between a point above the flange 147 and the void space below the flange 147 between the outer tube 142 and discharge spout 143. Preferably, and as shown, the air inlet 171 comprises an upper frusto-conical portion 173 and a lower cylindrical portion 172. The air inlet 171 is typically formed by a mould tool such as a pin. The tapered profile of the air inlet 171 allows the mould tool to be more easily removed from the moulded component. The wall of the outer tube 142 in the vicinity of the air inlet 171 is shaped to form a chute leading from the air inlet 171 to the inlet 145 of the discharge spout 143. As shown in FIG. 16a, a canted shoulder 174 is formed between the air inlet 171 and the chute to ensure that the jet of beverage issuing from the slot 170 does not immediately foul on the upper surface of the flange 147 in the immediate vicinity of the air inlet 171.

The inner member 103 may be formed as a single integral piece from high density polyethylene, polypropylene, polystyrene, polyester, or a laminate of two or more of these materials. The inner member 103 is preferably made using injection moulding.

Alternatively, the inner member 103 may be made from a biodegradable polymer. Examples of suitable materials include degradable polyethylene, biodegradable polyester amide, poly lactic acids, starch-based polymers, cellulose derivatives and polypeptides.

The laminate 105 is gas and water impermeable and preferably formed from two layers, a first layer of aluminium and a second layer of cast polypropylene. The aluminium layer is between 0.02 and 0.07 mm in thickness. The cast polypropylene layer is between 0.025 and 0.065 mm in thickness. In one embodiment the aluminium layer is 0.06 mm and the polypropylene layer is 0.025 mm thick. This laminate 105 is particularly advantageous as it has a high resistance to curling during assembly. As a result the laminate 105 may be pre-cut to the correct size and shape and subsequently transferred to the assembly station on the production line without undergoing distortion. Consequently, the laminate 108 is particularly well suited to welding.

Other laminate materials may be used including polyethylene/aluminium/polypropylene, polyethylene/ethylene-vinyl alcohol polymer/polypropylene, polyethylene/metallised/polypropylene and aluminium/polypropylene laminates. Roll laminate stock may be used instead of die cut stock.

Assembly of the cartridge 100 involves the following steps:
a) the inner member 103 is inserted into the outer member 102;

b) the filter 104 is cut to shape and placed onto the inner member 103 so to be received over the cylindrical funnel 140 and come to rest against the annular frame 141;

c) the inner member 103, outer member 102 and filter 104 are joined by ultrasonic welding;

d) the cartridge 100 is filled with one or more beverage ingredients;

e) the laminate 105 is affixed to the outer member 102,

These steps will be discussed in greater detail below.

The outer member 103 is orientated with the open bottom 112 directed upwards. The inner member 103 is then inserted into the outer member 102 with the outer rim 151 being received as a loose fit in an axial extension 114 at top 111 of the cartridge 100. The cylindrical extension 118 of the outer member 102 is at the same time received in the upper portion of the cylindrical funnel 140 of the inner member 103.

The third portion 121 of the cylindrical extension 118 is seated inside the support rim 167. The shoulder 132 of the cylindrical extension 118 between the second portion 120 and third portion 121 bears against the upper edge of the support rim 167 of the inner member 103. An interface zone is thus formed between the inner member 103 and the outer member 102 comprising a face seal between the cylindrical extension 118 and the support rim 167 which extends around nearly the whole circumference of the cartridge 100. The seal between the cylindrical extension 118 and the support rim 167 is not fluid-tight though since the slot 170 in the support rim 167 extends through the support rim 167 and downwardly to a point marginally below the shoulder 168. Consequently the interface fit between the cylindrical extension 118 and the support rim 167 transforms the slot 170 into an aperture providing gas and liquid communication between the annular channel 169 and the discharge spout 143. The aperture is typically 0.64 mm wide by 0.69 mm long.

The filter 104 is then placed over the inner member 103 such that the filter material contacts the annular rim 151. An ultrasonic welding process is then used to join the filter 104 to the inner member 103 and at the same time, and in the same process step, the inner member 103 to the outer member 102. The inner member 103 and filter 104 are welded around the outer rim 151. The inner member 103 and outer member 102 are joined by means of weld lines around the outer rim 151 and also the upper edges of the webs 154.

Figure 1:
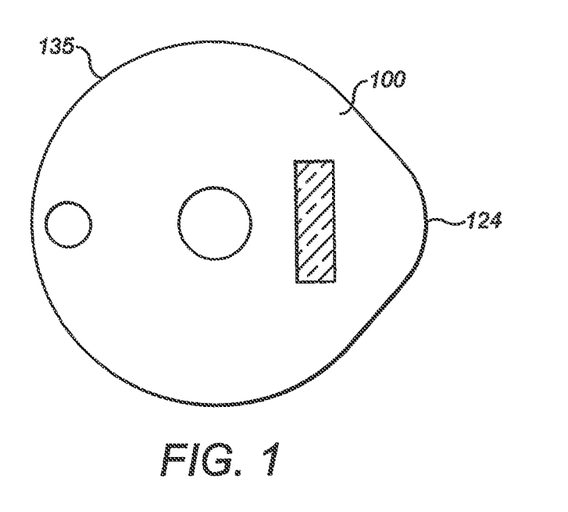
FIG. 1 is a plan view of a prior art beverage cartridge of the type described in EP-A-1440903.
Figure 2:
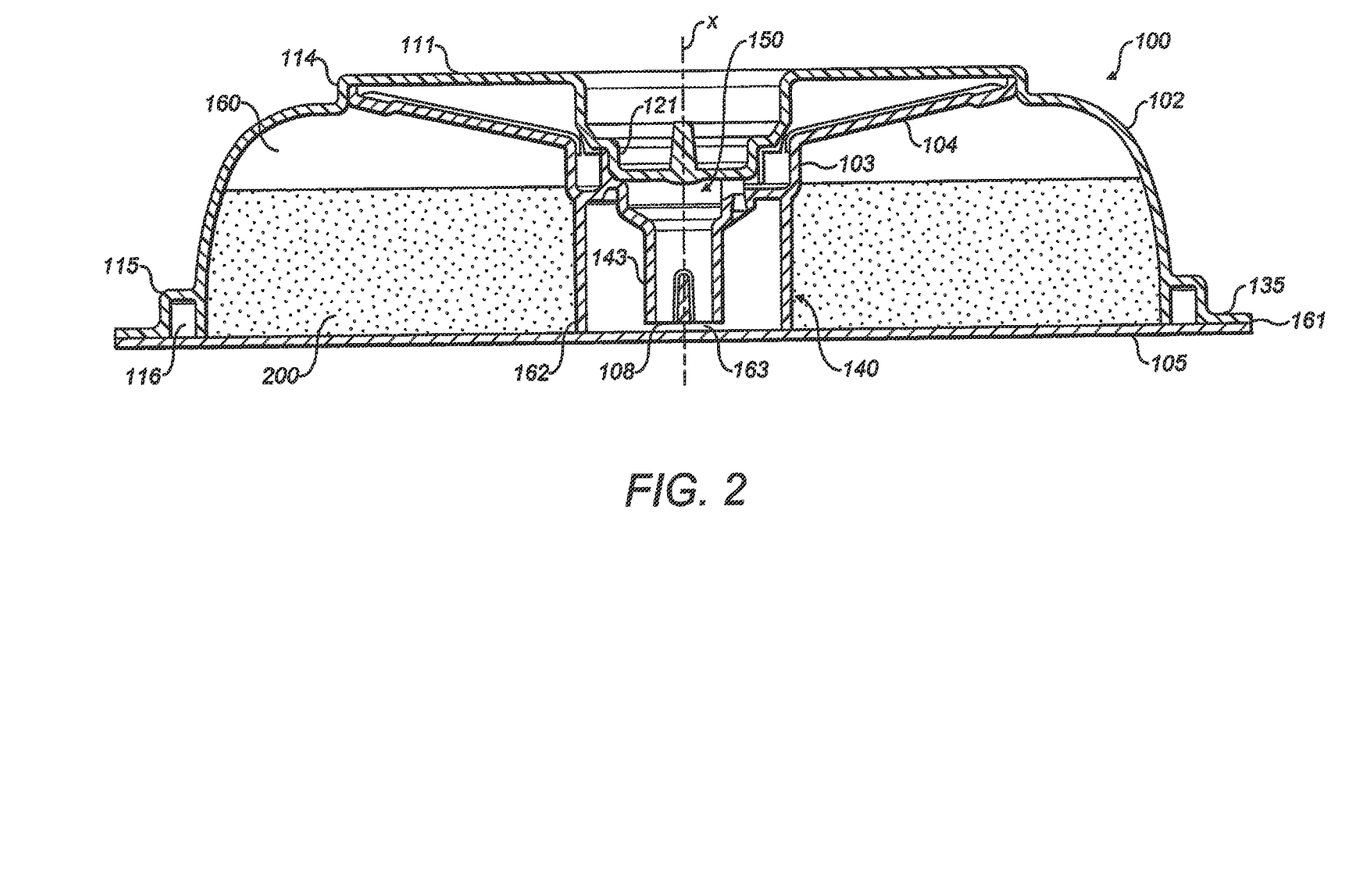
FIG. 2 is a cross-sectional side elevation of the cartridge of FIG. 1.

As shown most clearly in FIG. 2, the outer member 102 and inner member 103 when joined together define a void space in the interior 106 below the annular flange 141 and exterior the cylindrical funnel 140 which forms a filtration chamber. The filtration chamber 160 and passages 157 above the annular frame 141 are separated by the filter paper 104.

The filtration chamber 160 contains the one or more beverage ingredients 200. The one or more beverage ingredients 200 are packed into the filtration chamber 160. For an espresso-style beverage the ingredient is typically roast and ground coffee. The density of packing of the beverage ingredients in the filtration chamber 130 can be varied as desired. Typically, for a filtered coffee product the filtration chamber contains between 5.0 and 10.2 grams of roast and ground coffee in a filtration bed of thickness of typically 5 to 14 mm.

The laminate 105 is then affixed to the outer member 102 by forming a weld 161 around the periphery of the laminate 105 to join the laminate 105 to the lower surface of the outwardly extending flange 135. The weld 161 is extended to seal the laminate 105 against the lower edge of the cylindrical wall 127 of the inlet chamber 126. Further, a weld 162 is formed between the laminate 105 and the lower edge of the outer tube 142 of the cylindrical funnel 140. The laminate 105 forms the lower wall of the filtration chamber 160 and also seals the inlet chamber 126 and cylindrical funnel 140. However, a small gap 163 exists prior to dispensation between the laminate 105 and the lower edge of the discharge spout 43. A variety of welding methods may be used, such as heat and ultrasonic welding, depending on the material characteristics of the laminate 105.

Advantageously, the inner member 103 spans between the outer member 102 and the laminate 105. The inner member 103 is formed from a material of relative rigidity, such as polypropylene. As such, the inner member 103 forms a load-bearing member that acts to keep the laminate 105 and outer member 102 spaced apart when the cartridge 100 is compressed. It is preferred that the cartridge 100 is subjected to a compressive load of between 130 and 280N in use. The compressive force acts to prevent the cartridge failing under internal pressurisation and also serves to squeeze the inner member 103 and outer member 102 together. This ensures that the internal dimensions of passageways and apertures in the cartridge 100 are fixed and unable to change during pressurisation of the cartridge 100.

In use the water, under pressure, enters the cartridge 100 through the inlet 107 into the inlet chamber 126. From there the water is directed to flow through the slots 117 and round the manifold 116 and into the filtration chamber 160 of the cartridge 100 through the plurality of slots 117. The water is forced radially inwardly through the filtration chamber 160 and mixes with the beverage ingredients 200 contained therein. The water is at the same time forced upwardly through the beverage ingredients 200. The beverage formed by passage of the water through the beverage ingredients 200 passes through the filter 104 and filtration apertures 155 into the passages 157 lying above the annular frame 141.

Figure 8:
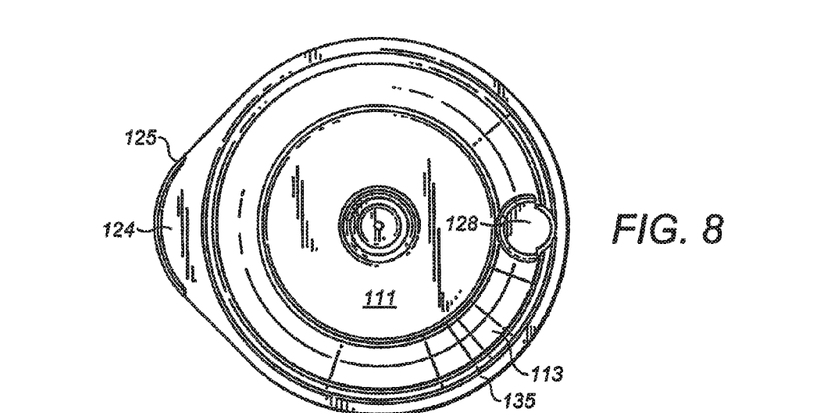
FIG. 8 is a plan view from above of the outer member of FIG. 3.

Beverage in the radial passages 157 flows downwardly along the passages 157 formed between the webs 154 and through the openings 156 and into the annular channel 169 of the cylindrical funnel 140. From the annular channel 169 the beverage is forced under pressure through the aperture 128 by the back pressure of beverage collecting in the filtration chamber 160 and passages 157. The beverage is thus forced through aperture as a jet and into an expansion chamber formed by the upper end of the discharge spout 143. As shown in FIG. 8, the jet of beverage passes directly over the air inlet 171. Passage of the beverage through the restriction of the aperture causes the pressure of the beverage to be reduced. As the beverage enters the discharge spout 143 the pressure of the beverage is still relatively low. As a result air is entrained into the beverage stream in the form of a multitude of small air bubbles as the air is drawn up through the air inlet 171. The jet of beverage issuing from the aperture is funneled downwards to the outlet 144 where the beverage is discharged into a receptacle such as a cup where the air bubbles form the desired crema. Thus, the aperture and the air inlet 171 together form an eductor which acts to entrain air into the beverage. Flow of beverage into the eductor should be kept as smooth as possible to reduce pressure losses. It should be noted, however, that in a high pressure state, this mechanism of air eduction is de-activated.

The sealing of the filter 104 onto the spokes 153 and the welding of the rim 151 with the outer member 102 ensures that there are no short-circuits and all the beverage has to pass through the filter 104.

The first construction of cartridge 100 described above is given as an example of an "eductor" type of cartridge. However the disclosure is equally applicable to a "non-eductor" type cartridge as described below.

Figure 13:
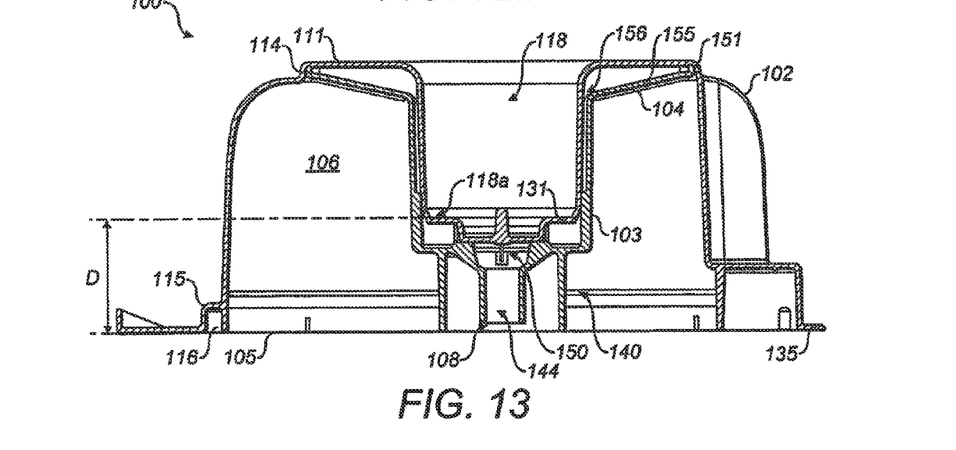
FIG. 13 is a cross-sectional side elevation of another version of cartridge.

FIG. 13 shows a second construction of beverage cartridge 100. Like components between the first and second embodiments have been referenced with like numerals. Many of the components and functions of the second construction of cartridge 100 are the same as for the first construction. However, it can be seen from FIG. 13 that the cartridge 100 has a greater overall height compared to the cartridge 100 shown in FIG. 9. The outer member 102 is taller and thereby defines a larger void space in which a larger quantity of beverage ingredients 200 can be stored. The second construction of cartridge 100 is therefore suitable for dispensing larger volumes of beverage. The diameter of the outer member 102 and cartridge 100 are the same as in the first construction. Typically the storage volume of the cartridge 100 when assembled is 50 to 58 ml±20%. As with the first construction, the upper surface of the outer member 102 is provided with a recess having a clamping surface 118 located at a bottom thereof. The separation D between surface 118a and the underside of the laminate 105 is the same as for the first construction. As a result, the elongated recess extends approximately 60% of the distance towards the laminate 105. This advantageously allows for a simplified clamping arrangement to be used as described below. In this construction, there is no eductor 171.

Figure 14:
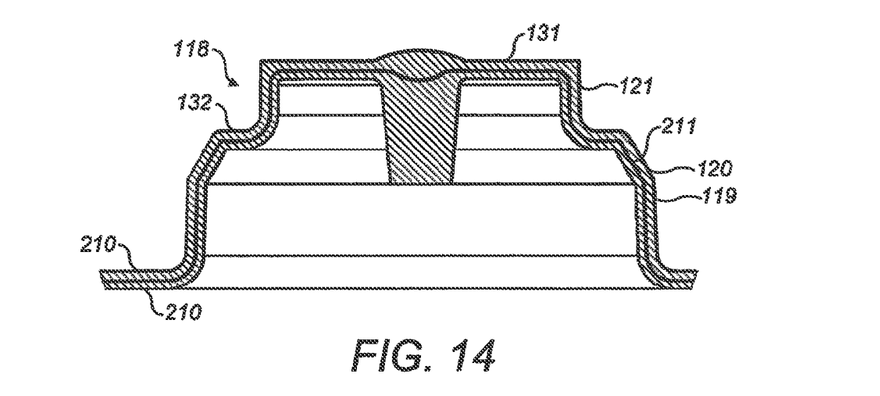
FIG. 14 is a cross-sectional side elevation of a simple co-injected moulded body; the body being in the form of an outer member for a cartridge similar to that shown in FIGS. 1 and 2.
Figure 15:
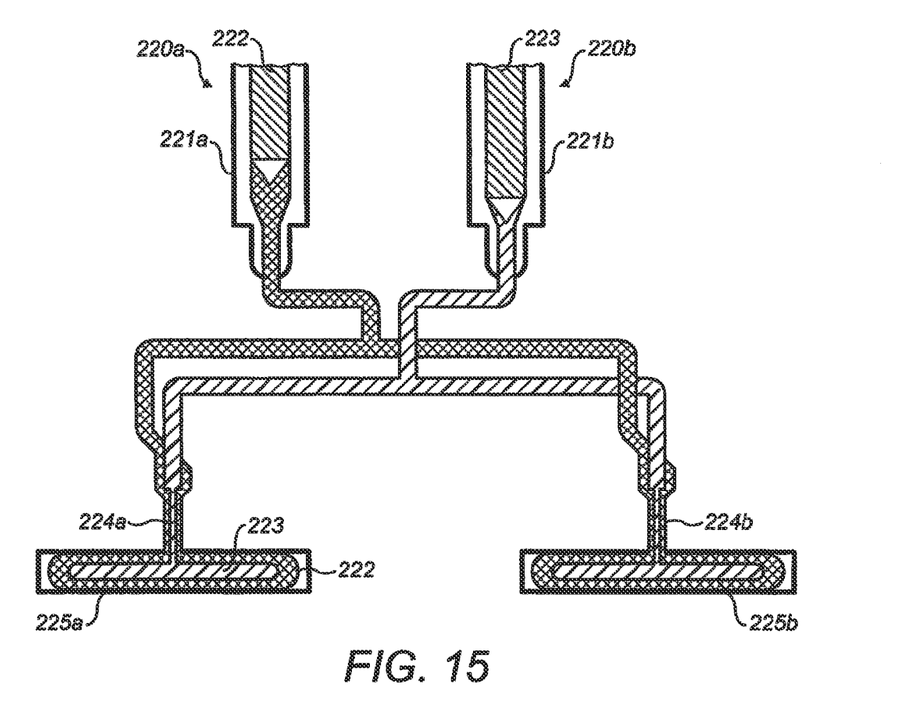
FIG. 15 is a schematic representation of a co-injection process used in the manufacture of the moulded body of FIG. 14.

As shown in FIGS. 14 and 15 a simple symmetrical moulded article may be produced by co-injecting a skin material 222, such as polyethylene, to form an outer skin 210 and a core material 223, such as EVOH, to form an uninterrupted central core 211 which is totally encapsulated by the outer skin 210.

This can be achieved using the co-injection process shown schematically in FIG. 15. In simple terms, the process utilises injection apparatus comprising two injection units 220a, 220b, each comprising a heated barrel 221a,221b to which the granules of the two materials 222,223 are respectively fed. The skin material 222 is fed to one barrel 221a and the core material 223 is fed to the other barrel 221b. The plastic melt streams from each barrel 221a,221b are forced through a manifold which ports them into a single injection nozzle 224a,224b at one or more injection stations, each of which comprises a mechanism needle for directing the flow of the two materials. The apparatus controls the combination of the separate streams of the materials 222, 223 to achieve a skin-core-skin flow sequence through the manifold into the mould. In the resulting single stream the second material 223 is encased by the first material 222.

The mould (or die) is typically made from hardened or pre-hardened steel and comprises plates which are locked together during the injection process and opened substantially to release the moulded articles. Channels are formed within the mould manifold to deliver the molten materials 222, 223 from the barrel to the injection port to reach the mould cavity, which is shaped to the form of the desired article. The mould must be designed to enable the injected materials 222/223 to fill the cavity completely, and to allow the finished article to be ejected.

As will be understood from FIGS. 1 to 13 the design of the outer member 102, and therefore the mould cavity, is neither simple nor symmetrical. In particular the outwardly extending shoulder 133 which forms the secondary wall 115, which is co-axial with the annular wall 113, provides a geometric complexity which gives rise to problems in co-injecting the two materials 222,233.

This is illustrated in FIGS. 16a to 16d which are schematics showing the combined stream of the skin material 222 and the core material 223 flowing along a primary flow path 230 which bifurcates into secondary flow paths 231a and 231b, in which all the flow paths 230, 231a and 231b have constant cross sectional areas and no radii. The stream will split evenly along the secondary flow paths 231a and 231b as they have equal resistance. However the core material 233 will be biased to the outside of the skin 222 after the split rather than remaining central to the stream. In this area of the part the flow is non-laminar and the turbulence caused by the bifurcation causes the layer structure to degrade, potentially causing the inner material to contaminate the part surface or become unprotected.

This means that, where the core material 223 is a barrier material, it may not be sufficiently protected by the skin material 222 and the impermeability of the annular wall 113 is compromised. The strength of the component may also be compromised if the disruption causes the core material 223 to fold, resulting in an increase in the number of layers. In the example of the outer member 102, the shoulder 133 and secondary wall 115 provide strengthening for the flange 135, so cannot be simply eliminated as in the simplified design shown in FIG. 14.

In the present disclosure the flow of the stream of materials 222,223 is controlled by providing flow paths in the mould cavity which ensure that the core material 223 is able to flow with the skin material 222 to the areas of the cavity where it is required to be present in the corresponding parts of the finished article (parts formed in first areas of the mould cavity), at the sacrifice of other areas (areas formed in second areas of the mould cavity) where it is not required. Furthermore the core material 223 is preferably eliminated from areas of the part where it may become a weakness when attempting to attach other components. This can occur as the core material may act as a contaminant where it is exposed at contact surfaces or results in a layer thickness so thin that it cannot provide the necessary strength. In the present example of the cartridge outer member 102, the outer end of the flange 135 does not need to be fully impermeable as it does not form part of the enclosure for the beverage ingredients, so these are formed in second mould cavity areas. The annular wall 113 and secondary wall 115, on the other hand, do form part of the beverage ingredient enclosure, so must be fully impermeable and are therefore formed by first mould cavity areas. Consequently the core material 223, which is a barrier material, does not need to extend all the way to the end of the flange 135 but it does need to fully extend along the walls 113, 115.

This is achieved by providing flow paths within the first and second mould cavity areas which have a higher and lower resistance relative to each other where a single flow path splits. This is explained with reference to FIGS. 17a to 17c. In this case, there is single primary flow path 230 which bifurcates to form two secondary flow paths 231a and 231b. The design of one of the secondary flow paths 231b is modified to promote preferential flow along that path, by reducing the flow resistance within the path compared to the other secondary flow path 231a.

Figures 17A, 17B, 17C:
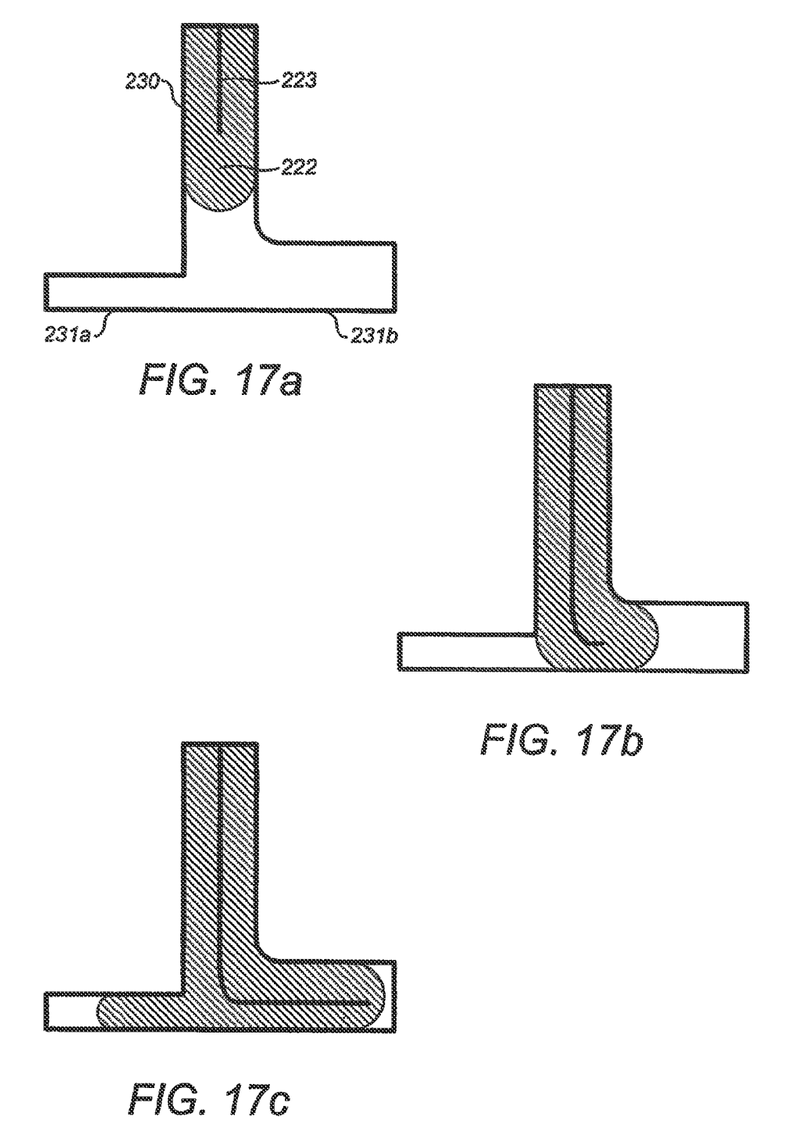
FIGS. 17a to 17c are schematics showing the controlled flow of two co-injected materials to a bifurcated section of a complex component.

The stream of materials 222/223 will tend to take the route of least resistance and so will flow along the secondary flow path 231b to fill that part of the cavity, before it will follow the other secondary flow path 231a Thus the primary flow path 230 and the one secondary flow path 231b lie in a first mould cavity area and are substantially filled with both materials 222/223 with the leading end of the core material 223 terminating at the end of the flow path 231b. There is therefore no flow of core material 223 into the other secondary flow path 231a, which lies in a second mould cavity area, so only the skin material is present in that section of the part. The net effect is to enable the elimination of the core material 223 in one path 231a whilst ensuring its integrity in the other path 231b. This can be achieved in a number of ways, such as including radii, increasing the cross-sectional area, changing the length of the flow path (which affects back pressure), and altering the angle of one or both of the secondary flow paths relative to the primary flow path. The choice of materials with advantageous viscosities can even be selected to influence the path of least resistance for the material to give the desired flow state.

Although only a simple example has been illustrated with a single primary flow path 230 which divides into two secondary flow paths 231a and 231b, many moulded articles are significantly more complex. For example the primary flow path can divide into more than two secondary flow paths, in which case one of these will be designed to have a lower resistance than the others. A secondary flow path which does not terminate may be considered to be a primary flow path which again splits into two or more further secondary paths.

Whilst the present disclosure has been described with reference to the core material 223 being a barrier material, it can of course be a non-barrier material such as a coloured layer which is required to be present in certain parts of the finished article and which can be missing from other parts.

The invention claimed is:

1. A method of forming a multilayer injection moulded article comprising an outer skin of a first material and a central core of a second material encapsulated by the outer skin, the method comprising:
   injecting the first and second materials in a single stream into a mould cavity of an injection mould, with the second material encased within the first material;
   controlling a flow of the stream by a plurality of flow paths within the mould cavity such that both the first and second materials are present in at least one first mould cavity area and only the first material is present in at least one second mould cavity area, the plurality of flow paths including at least one primary flow path in the first mould cavity area, which primary flow path divides into at least two secondary flow paths;
   wherein the resistance of a first path of the at least two secondary flow paths in the first mould cavity area is reduced relative to that of a second path of the at least two secondary flow paths in the second mould cavity area;
   wherein controlling the flow of the stream includes advancing the first and second materials together into the first secondary flow path;
   wherein the mould cavity is configured to form an outer member of a beverage cartridge and the second mould cavity area forms a flange portion of the outer member; and
   controlling the flow of the stream by the plurality of flow paths within the mould cavity includes advancing only the first material into the second of the secondary flow paths to form the flange portion.

2. The method as claimed in claim 1 wherein the first material is substantially liquid impermeable.

3. The method as claimed in claim 2 wherein the second material is substantially gas resistant.

4. The method as claimed in claim 3 wherein the first and second materials are different polymeric materials.

5. The method as claimed in claim 1 wherein the resistance of the first of the at least two secondary flow paths is reduced relative to that of the second of the secondary flow paths by varying one or more of the following elements of the secondary flow paths relative to each other:
   cross sectional area of the secondary flow paths;
   length of the secondary flow paths;
   radii between the primary flow path and the first secondary flow path of the at least two secondary flow paths; and
   at least one angle between the primary flow path and one or both of the secondary flow paths.

6. The method as claimed in claim 1 wherein one or more of the secondary flow paths become primary flow paths which divide again to form further secondary flow paths.

7. The method as claimed in claim 6 wherein the primary flow path divides into multiple secondary flow paths.

8. The method as claimed in claim 1 wherein the second material is substantially gas resistant.

9. The method as claimed in claim 1 wherein the first and second materials are different polymeric materials.

10. The method as claimed in claim 1 further comprising connecting a lid to the flange portion of the beverage cartridge outer member.

11. A method of forming a multilayer injection moulded article, the method comprising:
    co-injecting a first material and a second material in a single stream into a mould cavity of an injection mould, with the second material being encased within the first material;
    advancing the first material and the second material encased in the first material along a primary flow path of the mould cavity toward an area of the mould cavity where the primary flow path divides into at least two secondary flow paths;
    directing the first and second materials together into a first of the secondary flow paths having a resistance that is reduced relative to a second of the secondary flow paths;
    directing only the first material into the second of the secondary flow paths;
    wherein the mould cavity is configured to form an outer member of a beverage cartridge; and
    directing only the first material into the second of the secondary flow paths forms a flange portion of the outer member.

12. The method of claim 11 further comprising:
    removing the outer member from the mould cavity; and
    welding a member to the flange portion of the outer member formed in the second of the secondary flow paths of the mould cavity.

13. The method of claim 11 further comprising advancing the first material and the second material together along the first of the secondary flow paths toward an area of the mould cavity where the first of the secondary flow paths divides to form a plurality of further secondary flow paths.

14. The method of claim 13 further comprising:
    advancing the first and second materials together along one of the plurality of further secondary flow paths; and
    directing only the first material into another one of the plurality of further secondary flow paths.

15. The method of claim 11 wherein the first material is substantially liquid impermeable.

16. The method of claim 15 wherein the second material is substantially gas resistant.

17. The method of claim 11 wherein the first and second materials are different polymeric materials.

18. The method of claim 11 wherein advancing the first material and the second material encased in the first material along the primary flow path of the mould cavity includes advancing the first and second materials in a first direction; and directing the first and second materials together into the first of the secondary flow paths includes directing the first and second materials in a second direction substantially perpendicular to the first direction.

* * * * *